United States Patent [19]

Szilagyi et al.

[11] 4,398,696
[45] Aug. 16, 1983

[54] BUTTERFLY VALVE

[75] Inventors: Dezso Szilagyi, Carnston; John P. Cunningham, Narragansett; Robert L. Bowlby, Warwick, all of R.I.

[73] Assignee: General Signal Corp., Stamford, Conn.

[21] Appl. No.: 316,798

[22] Filed: Oct. 30, 1981

[51] Int. Cl.³ ............................................. F16K 1/226
[52] U.S. Cl. .................................... 251/307; 277/166; 277/188 R
[58] Field of Search ............... 251/307, 173, 171, 306; 277/166, 188 R

[56] References Cited

U.S. PATENT DOCUMENTS

| 3,401,915 | 9/1968 | Kim | 251/172 X |
| 3,814,380 | 6/1974 | Kormos et al. | |
| 4,036,468 | 7/1977 | Webb | 251/307 X |
| 4,082,246 | 4/1978 | Rothwell | 251/307 |
| 4,281,818 | 8/1981 | Cunningham et al. | 251/307 |

FOREIGN PATENT DOCUMENTS 1000912  8/1965  United Kingdom .

Primary Examiner—Martin P. Schwadron
Assistant Examiner—Sheri M. Novack
Attorney, Agent, or Firm—Leitner, Palan, Martin and Bernstein

[57] ABSTRACT

This invention concerns a butterfly valve having a resilient, adjustable seat for pivoting disc. The seat comprises an elastomeric seating attached to a clamping ring which slides along the walls of the first portion of the flow passage extending through the body. A plurality of actuators extend through the clamping ring and seat ring into an axial annular wall to initially compress the seat ring. The flow passage is configured so that the axial wall of the clamping ring is uniformly exposed to the fluid pressure in the first passage portion.

5 Claims, 4 Drawing Figures

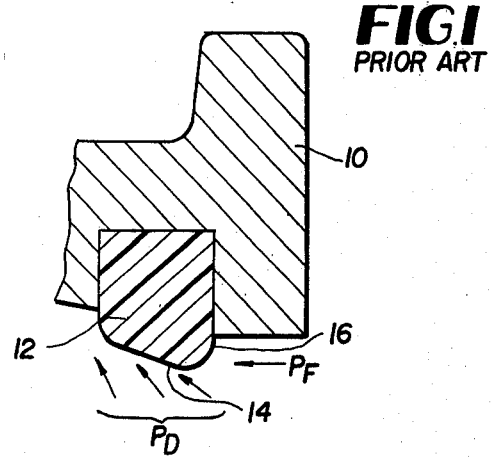
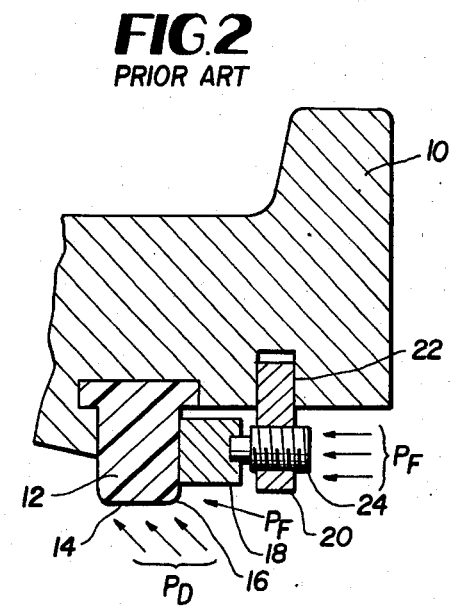
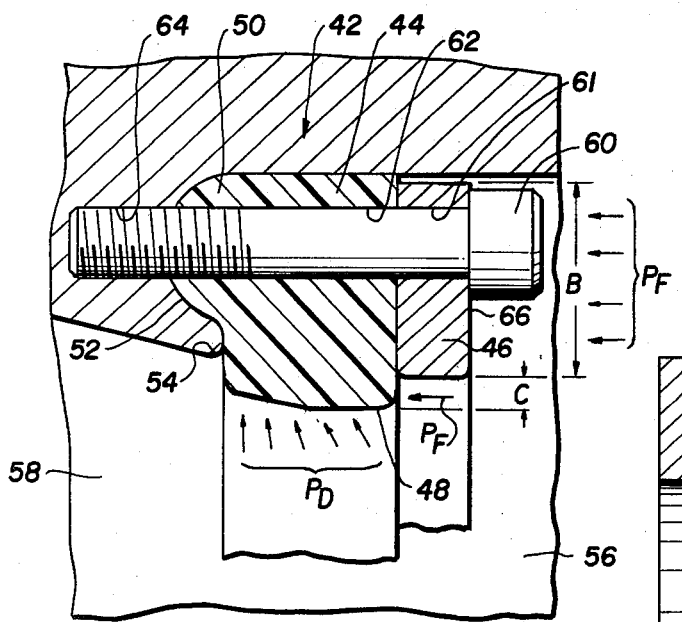
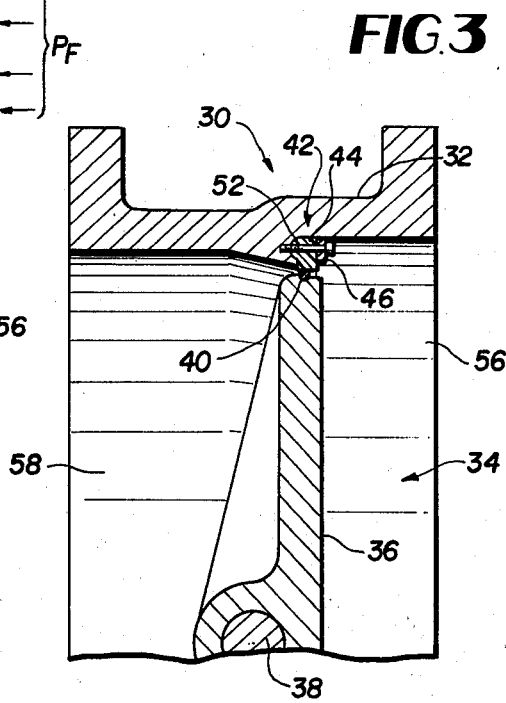

BUTTERFLY VALVE

BACKGROUND OF THE INVENTION

The present invention relates generally to butterfly valves and more specifically to an improved valve seat for butterfly valves.

In early butterfly valves, the seat ring was bonded to a radially extending annular recess in the housing. This is illustrated specifically in FIG. 1. There is no adjustability of the amount of bulge or protrusion of the seat ring. The only pressures acting against it were those of the disc during engagement $P_D$ and axial forces only on the exposed edge from the fluid pressure $P_F$. This provided uneven pressure distributions across the seat ring. When the valve seat had to be replaced or repaired, the valve is removed from the line, heated up until the bond between the seat ring and body is broken, the remaining epoxy chipped away and the new epoxy or vulcanizing is applied to a new seat ring in order to bond the seat into the body.

In U.S. Pat. No. 3,814,380 there is described an invention for an adjustable seat construction in a butterfly valve. That invention provides an adjustable seat construction which is inexpensive to manufacture, gives uniform pressure between a seat ring and disc, and thus can be operated with minimum torque, and allows replacement of the rubber seat ring in the field. The valve seat ring employs rectangular- or trapizoidal-shaped elastomer (e.g. rubber) seats which are either epoxy bonded or vulcanized into a machined recess in the valve body. A clamping ring with adjustable actuators provides adjustment for the seat ring. When the valve seat has to be replaced or repaired, the valve is normally removed from the line, heated up until the bond between the valve seat and body is broken down, the remaining epoxy is chipped away, and then new epoxy or vulcanizing is applied to a new seat in order to bond the seat into the body.

In pending U.S. patent application Ser. No. 154,545 entitled "Replaceable Adjustable Butterfly Valve Seat" to John P. Cunningham, there is described an invention for an adjustable seat construction for a butterfly valve wherein the seat ring is T-shaped and confined at one end by the transverse wall of an annular groove in the valve body and at the other end by a clamping ring which slides along the walls of the flow passage extending through the body. The clamping ring is forced against the seat ring by a plurality of individual screw actuators. The T-shaped elastomeric seat ring is held in place solely by the mechanical forces to facilitate removal, maintenance and replacement thereof. An example of this type of ring is illustrated in FIG. 2. The T-shaped ring seat 12 is received in the housing 10 and is held therein by a clamping ring 18 which adjustably compresses the seat ring 12 by an actuator which includes an annular ring 20 received in annular recess 22 of the housing and threaded actuators 24. Although the seat ring 12 is easily removed since it is not bonded to the housing, the compression and bulging of the seat ring are controlled by clamping ring 18 and the actuator assembly. The pressure from the fluid flow is no different than that of FIG. 1 for the bonded in the housing seat ring. The annular ring 20 absorbs the majority of the pressure created by the fluid $P_F$ and only the exposed axial surface 16 of the seat ring 12 is affected by the fluid pressure $P_F$.

Another alternative to bonding the ring to the housing is illustrated in United Kingdom Patent Specification 1,000,912. An annular seat ring is bonded to an annular clamping ring set and secured to the housing by a plurality of threaded elements. The annular seat ring engages the housing along a radial plane and thereby lacks a locking action except for the threaded elements. As in the previous examples, the only exposed portion of the seat ring is that small portion which extends above the edge of the flow passage.

Accordingly, it would be desirable to have an adjustable butterfly valve seat that retains all of the advantages of the above-identified inventions, as well as includes a readily replaceable seat ring which is uniformly responsive to fluid pressure.

SUMMARY OF THE INVENTION

The object of this invention is to provide an improved adjustable seat construction which is inexpensive to manufacture, provides uniform pressure between seat and disc, can be operated with minimum torque, allows ready replacement of the rubber seat in the field and is uniformly responsive to fluid pressure. In the new construction, an endless elastomeric seat ring is attached along a radial face to a clamping ring. The housing which includes a flow passage has an annular radially extending wall interconnecting the radially displaced first and second portions of the flow passage. A plurality of screw threaded elements spaced from one another in the direction of the circumference of the clamping ring extends through the apertures in the clamping ring and seat ring and into the radial wall. The screw threaded elements are adjusted to force the clamping ring axially and thereby compress the seat ring producing a bulging of the seating surface. The first passage portion is configured such that the axial wall of the clamping ring is uniformly exposed to fluid pressure in the first passage portion with the valve closed to uniformly increase the bulging of the seating surface. The radial wall includes an axial annular recess which receives and engages an axially extending portion of the seat ring. The axial recess forms a substantial portion of the radial wall. The inner diameter of the clamping ring exceeds the inner diameter of the seating ring in the range of 5% to 20% under threaded element compression. Since the elastomeric seat ring is mechanically locked into its sealing position, the seat ring can be easily removed and replaced in a relatively short time, without the need for physically removing the butterfly valve from its associated system.

BRIEF DESCRIPTION OF THE DRAWINGS

FIG. 1 is a partial sectional view of a prior art seat ring and housing.

FIG. 2 is a partial sectional view of another prior art valve seat and housing.

FIG. 3 is a partial sectional view of a butterfly valve incorporating the principles of the present invention.

FIG. 4 is an enlarged partial sectional view of a portion of FIG. 3.

DESCRIPTION OF THE PREFERRED EMBODIMENTS

Referring to FIGS. 3 and 4, the illustrative butterfly valve 30 comprises a cast iron or other suitable material, cylindrical body 32 formed with a through flow passage 34 and a circular disc 36 carried by a rotary shaft 38 which is supported by bearings mounted in the body 32.

The disc 36, which also is made of cast iron or other suitable material, is provided with a rounded corrosion-resistant valving edge 40 which is adapted to move into and out of sealing engagement with the improved body seat 42 of the present invention. The preferred valving edge 40 is a stainless steel ring which is shrink fitted into a groove in disc 36 in accordance with the teachings in U.S. Pat. No. 3,726,504, but other known valving edge designs may be used.

The new seat construction 42 includes a seat ring 44 and clamping ring 46 attached together by vulcanization or adhesive. The seat ring is made of rubber or other elastomeric material suitable for the service for which the valve is intended and is provided with a seating surface 48. The seat rings for valves up to 48 inches in diameter are molded in one piece; the seat rings for larger valves are made from several molded pieces which are joined end-to-end by vulcanization. An axially extending portion 50 of seat ring 44 is received by and fills an axial annular recess 52 formed in an annular radially extending wall 54. The seat ring 44 need not be bonded in place with epoxy adhesive, but rather is held in the annular recess 52 solely by mechanical forces.

The annular recess 52 is spaced axially from the disc shaft 38 so that the seat ring 44 can be an endless ring free of the shaft-encircling portions which increase operating torque, but the recess preferably is located as close as possible to the shaft 38 in order to minimize the thickness of disc 36. This goal is achieved in the illustrated embodiment by using the annular wall 54 which lies in a radial plane. The recess 52 is cut into the axial face of wall 54 to form a receiving portion for the axially extending portion 50 of the seat ring 44 and forms a substantial portion of the wall 54. The wall 54 divides flow passage 34 into a first and second flow section 56 and 58, respectively. The first and second flow passage portions 56 and 58 are displaced radially and are interconnected by the annular radially extending wall 54.

Clamping ring 46 is dimensioned with an outside diameter sufficiently less than the inside diameter of the first flow passage 56 to slide along the cylindrical wall of flow passage 56. The clamping ring 24 and seat ring 44 are urged into contact with the wall 54 and recess 52 by a series of threaded actuators 60 spaced uniformly around its circumference. Each actuator 60 traverses apertures 61 and 62 in the clamping ring 46 and seat ring 44, respectively, and is received in threaded apertures 64 in the wall 54. The actuators restrict radial motion of the clamping ring 46 and seat ring 44 while permitting axial movement. Clamping ring 46 and actuators 60 should be made of corrosion resistant material, such as stainless steel, in order to permit seat adjustment and replacement in the field even after long periods of service. The number of actuators 60 employed in the valve depends upon valve size and pressure rating. For a typical 20" valve having a pressure rating of 150 p.s.i. (and subjected to a bubble test pressure of 300 p.s.i.), eight actuators 60 employing five-sixteenths inch set screws have proven adequate.

The procedure for adjusting disc-seat interference is as follows:

a. Move the disc 36 to closed position and clamp the valve in a test fixture with its axis vertical and first flow passage 56 on the upper side.

b. Turn set actuators 60 finger tight.

c. Cover the upper surface of disc 36 with a pool of water.

d. Subject the lower face of disc 36 to air at the required test pressure and note the locations of leaks.

e. Tighten the actuators 60 closest to a leak until it stops, and then stop a leak on the diametrically opposite side of the disc.

f. Repeat step "e" until all leaks are stopped.

g. Maintain air pressure for 5 minutes and retighten the actuators 60 adjacent any new leaks which develop. While, in this procedure, pressure is applied to the side of disc 36, it should be understood that this is done solely to facilitate adjustment of actuators 60, from the side which is more critical as pressure concerned, and that the valve can be used in service to handle flow in either direction.

In the adjustment process leaks are stopped, and the required disc-seat interference is produced as a result of the inward bulging of seating surface 48 which occurs as seat ring 44 is compressed between wall 54 and clamping ring 46. This bulging effect is adversely affected by the presence of voids within the cavity defined by wall 54, recess 52, wall of passage 56 and clamping ring 46; therefore, it is important that the molded cross section of seat ring 44 conform rather closely to the cross-sectional shape of this cavity.

The seat structure of the present invention is configured so that the seat ring 44 is exposed to uniform pressure. This provides a better seal with the disc 36. As is evident from FIG. 3, the first flow passage 56 is configured such that the axial exterior wall 66 of clamping ring 46 is uniformly exposed to the pressure of the fluid when the valve is closed. This is illustrated in FIG. 4 as area B responsive to fluid pressure $P_F$. The exposed portion illustrated by the letter C of the ring seat 44 is also exposed to the fluid pressure represented by $P_F$. The seat 48 is responsive to the disc pressure indicated by the arrows $P_D$. The inner diameter of the clamping ring 46 exceeds the inner diameter of the seat ring 44 in the range of 5% to 20% when under compression from the threaded actuators 60. The clamping ring 46 and seat ring 44 will move axially in response to the fluid pressure $P_F$ along the actuators 60. Since the seat ring 44 is attached to the clamping ring 46, the amount of surface area to which the force of the clamping ring is applied is constant as is the dimension C. Thus, the seat ring 44 has the fluid pressure $P_F$ uniformly distributed thereacross in known proportions.

Since the clamping ring 46 and the seat ring 44 are responsive to the fluid pressure $P_F$ due to the structure of the first flow passage 56, the compression force produced by the actuator 60 is less than needed. This reduces the extension of the region C in a non-fluid pressure condition. This reduction extends the life of the seating face 48 of the seat ring 44 since the disc initially produces a low pressure $P_D$ against the seat ring which pressure is increased as the fluid pressure $P_F$ builds up with the valve closed. In general application, the distance C is one-sixteenth of an inch, for prior art valve seats, the distance C would be one-eighth of an inch for a 75 p.s.i. pressure differential. Thus, it can be seen that the amount of interference is reduced 50% which will reduce the force needed to close the valve and also extend the life of the seating ring.

Having thus described the subject invention, those skilled in the art will recognize that further modifications and additions may be made to the embodiments described above without departing from the spirit and scope of the following claims.

What is claimed:

1. In a butterfly valve including a body containing a through flow passage, and a pivoting disc which cooperates with a seat to control flow through the passage and which divides the passage into a first and second portion, an improved seat arrangement which comprises:

said first and second passage portions being displaced radially at said seat and interconnected by an annular radially extending wall having a height corresponding to said radial displacement of said first and second passage portions and a curvilinear axial annular recess which constitutes a substantial portion of said height and has a relatively large radius of curvature;

an endless elastomeric seat ring and a clamping ring each having a radially extending face and being abutted to each other along said radially extending faces, the radially extending face of said seat ring being flat over that entire surface, said clamping ring having an axially extending exterior wall with an outside diameter sufficiently less than the inside diameter of said first passage portion to allow said clamping ring to move axially in said first passage portion, and said seat ring includes an axially extending portion which engages and conforms to the shape of said axial annular recess;

a plurality of screw threaded elements spaced from one another in the direction of the circumference of the clamping ring and extending through apertures in said seat ring and said clamping ring and into said radially extending wall for adjustably forcing the clamping ring axially to thereby compress said seat ring and produce radially inward bulging of the seating surface; and said first passage portion and said seat arrangement being configured so that said exterior wall of said clamping ring is uniformly exposed to fluid pressure in said first passage portion and exerts uniform pressure on said seat ring with said valve closed to uniformly increase the bulging of the seating surface so as to provide a tighter seal between said valve and said seat ring.

2. The butterfly valve according to claim 1 wherein the inner diameter of said clamping ring exceeds the inner diameter of said seat ring in the range of 5% to 20% under threaded element compression.

3. The butterfly valve according to claim 1 wherein the inner diameter of said first passage portion is uniform and extends axially beyond the area of said first passage portion occupied by said seating and clamping ring so as to permit exposure of said exterior wall of said clamping ring to said fluid pressure.

4. The butterfly valve according to claim 1 wherein said seat ring has a surface area exposed to fluid pressure which causes compression of said seat ring in a direction generally perpendicular to the compression of said seat ring caused by the exposure of said clamping ring to fluid pressure.

5. The butterfly valve according to claim 1 wherein said screw threaded elements also extend through the axially extending portion of said seat ring.

* * * * *